Sept. 14, 1943.  G. CLAUSING  2,329,334
FIXTURE FOR RE-BLOCKING OR WEDGING LASTS
Filed Jan. 6, 1940  4 Sheets-Sheet 1

INVENTOR.
George Clausing
BY
ATTORNEYS.

Sept. 14, 1943.  G. CLAUSING  2,329,334
FIXTURE FOR RE-BLOCKING OR WEDGING LASTS
Filed Jan. 6, 1940  4 Sheets-Sheet 2
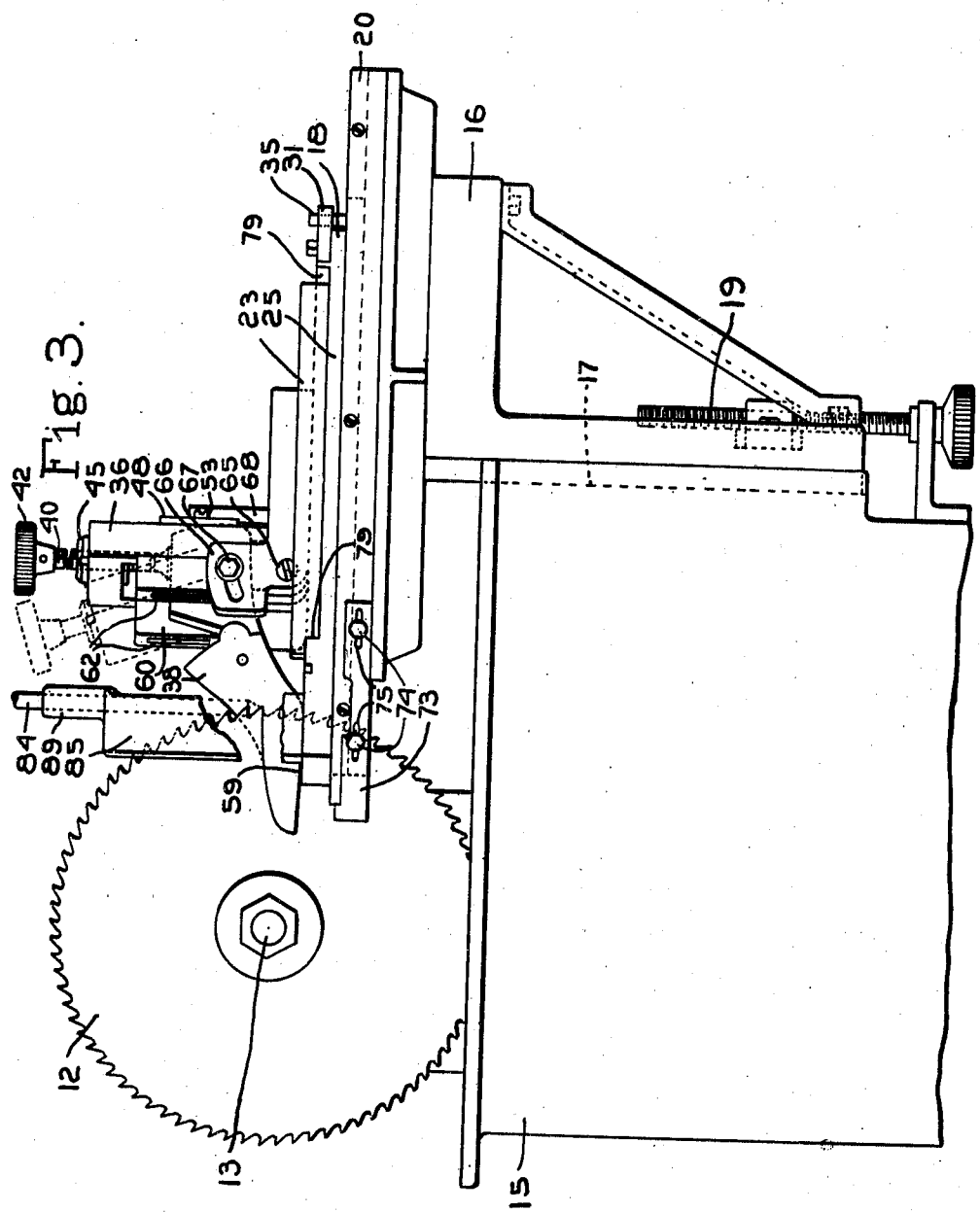
INVENTOR.
George Clausing
BY
Pennie Davis Marvin & Edmonds
ATTORNEYS.

Sept. 14, 1943.　　　G. CLAUSING　　　2,329,334
FIXTURE FOR RE-BLOCKING OR WEDGING LASTS
Filed Jan. 6, 1940　　　4 Sheets-Sheet 3
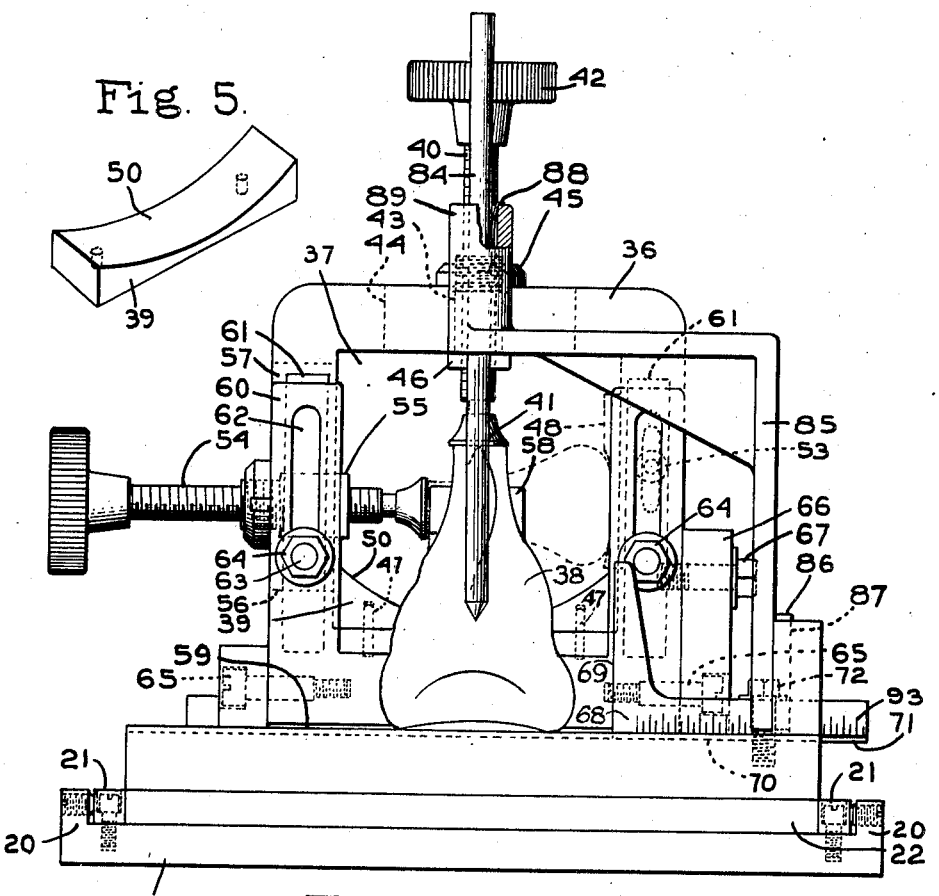
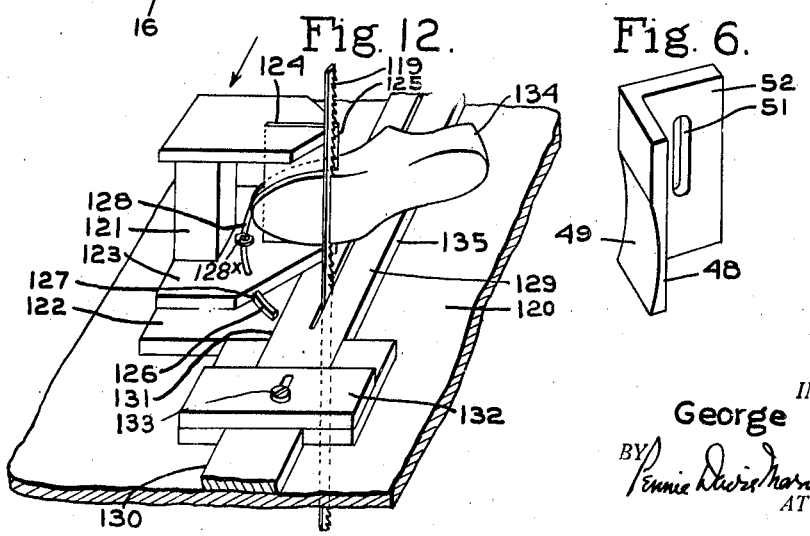
INVENTOR.
George Clausing
BY
ATTORNEYS.

Sept. 14, 1943.   G. CLAUSING   2,329,334
FIXTURE FOR RE-BLOCKING OR WEDGING LASTS
Filed Jan. 6, 1940    4 Sheets-Sheet 4
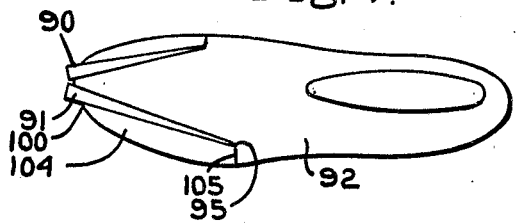
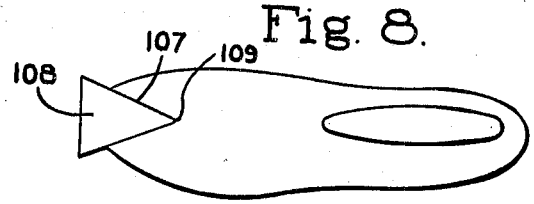
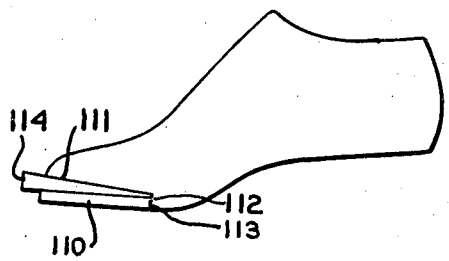
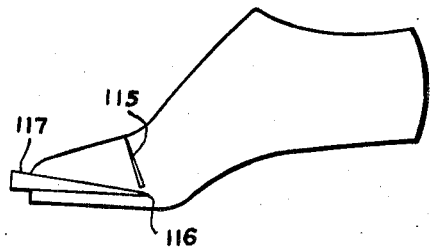
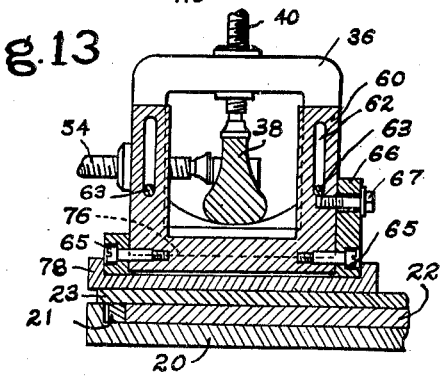
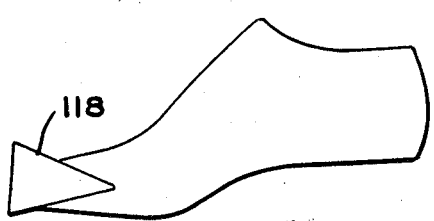
INVENTOR.
George Clausing
BY
Pennie Davis Marvin & Edmonds
ATTORNEYS.

Patented Sept. 14, 1943

2,329,334

UNITED STATES PATENT OFFICE 2,329,334

FIXTURE FOR REBLOCKING OR WEDGING LASTS

George Clausing, Portsmouth, Ohio, assignor to Vulcan Corporation

Application January 6, 1940, Serial No. 312,649

4 Claims. (Cl. 144—278)

This invention relates to a fixture adapted chiefly to guide a last block in predetermined paths with relation to a cutting device, thereby to cut recesses therein, within which wedges are to be received preparatory to a remodeling operation.

The principal object of the invention is to facilitate and render more accurate and uniform, the operation of wedging a last preparatory to a re-turning or remodeling operation.

A further object of the invention is to provide means in one device for making the several adjustments necessary to clamp a succession of lasts in a predetermined position to execute a required cutting operation in the various styles and sizes of lasts, thus to enable an operator to execute any type of wedging operation which may be required.

A further object of the invention is to so mechanize a heretofore semi-free-hand operation, that the production time is greatly lessened and the accuracy and uniformity of the product greatly increased.

A further object of the invention is to provide a gauging device by the use of which an operator may instantly place one or more lasts in exact position to execute a cut of predetermined length and location.

A further object of the invention is to provide an adjustable means for positively clamping a succession of similar lasts consistently in an accurately predetermined position.

A further object of the invention is to provide in a last wedging fixture a plurality of adjustments, which when manipulated in proper sequence, eliminate the necessity for great nicety of judgment, which would otherwise be required to prepare the device to receive a specific last.

A further object of the invention is to provide a device for the purpose stated herein, which is universal in its usefulness and adaptation to the rebuilding or remodeling of a last.

Other objects and features will more fully appear from the following specification in connection with the accompanying drawings and will be particularly pointed out in the claims.

The construction and principles of operation of the device may briefly be described as follows:

The practice of wedging lasts is a well known procedure in the last making art. Many lasts are reclaimed after a certain period of use by re-shaping the last to accord with the requirements of new types and styles of footwear. Such lasts would otherwise be rendered useless long prior to their normal wear life. It is possible to reshape these obsolete lasts and the first step in the re-shaping or remodeling of the lasts is the wedging operation, which is sometimes called a re-blocking operation. It is with this portion of the remodeling process that the present invention is concerned. Heretofore, the wedging operation has been executed inefficiently and with a lack of uniformity which is contrary to high quality high speed production. The present invention enables an unskilled operator to systematically follow through a specific sequence of operations accurately and rapidly to produce highly uniform results.

The saw employed for the cutting operation may be of the band saw type or an ordinary circular saw. In either case, during the sawing operation, the last is clamped in a movable carrier slidable on ways parallel to the plane of the saw blade, and its limit of travel inward toward the saw is fixed by a stop. The position of the last in the carriage is positively determined by a plurality of co-acting gauging elements. The carriage is composed of a base and an upper structure, the latter being pivoted upon the former to swing about a vertical axis. Such pivoting means enables the operator to swing the last, which is fixed in the upper structure, into a required angular position with respect to the saw, to perform a variety of wedging operations, the details of which will be pointed out hereinafter.

The last clamping means is composed of a yoke member, which is provided with clamping screws for securing the last in a normal or vertical position or on its side in a horizontal position with respect to the saw. This yoke may be raised or lowered to accommodate lasts of various heel heights and also may be swung or tilted in a plane at 90° to the axis between the afore-mentioned base and upper structure of the carriage. This latter tilting adjustment enables the forepart of the last to be swung downward until it engages the top surface of the carriage, in which position the yoke is clamped. The clamping yoke is also provided with adjustments for movement forward and backward and laterally with respect to the carriage ways. By proper manipulation of the latter adjustment, the last is moved bodily into position for executing the required cut. As will hereinafter appear, means are provided for greatly simplifying the execution of these adjustments.

A stop is provided to limit the inward movement of the carriage, while the elements of the fixture and the saw are so co-related that when the carriage reaches its stop position, the forward edge of the saw teeth will lie on the axis between the carriage base and upper structure. The end of any cut, no matter what the angle, will, therefore, lie on this axis. This feature enables the operator to properly place the last in the fixture to produce a cut of desired angle and depth prior to the execution of the cut and without the necessity of a preliminary or trial cut.

The positioning of the last in the carriage is simplified still more by the provision of an indicator in the form of a pointer vertically movable on the aforementioned axis between the base and upper structure of the carriage. By moving the pointer down into close proximity to the last, the exact location of the end of the cut will be indicated on the last. The clamping yoke carrying the last is then adjusted until the desired location of the end of the cut is beneath the pointer. At this time, all adjusting devices are tightened and the carriage is then fed toward the saw to make the cut.

To insure the correct lateral and length-wise location of subsequent lasts of the same size and type, a back gauge is secured to the clamping yoke against which the rear surface of the heel abuts. A side gauge is also provided, against which the side of the last is placed when it is clamped in position.

To accurately and completely present the principles of the invention, a specific embodiment thereof will now be described, in which:

Fig. 3 is a side elevation of the device.

Fig. 4 is an end view of the device, showing a last in the clamping means.

Fig. 5 is a perspective view of a detachable heel rest unit for use in clamping the last in the carriage when it is desired to make a vertical cut.

Fig. 6 is a perspective view of a detachable heel rest for use when the last is clamped on its side in a horizontal position.

Figs. 7, 8, 9, 10 and 11 illustrate examples of the work which may be performed upon the device.

Fig. 12 is a perspective view of an apparatus for performing one of the steps in the process of expanding lasts by inserting wedges therein.

Fig. 13 is a cross-sectional view on the line 13—13 in Fig. 1.

Figures 1, 2:
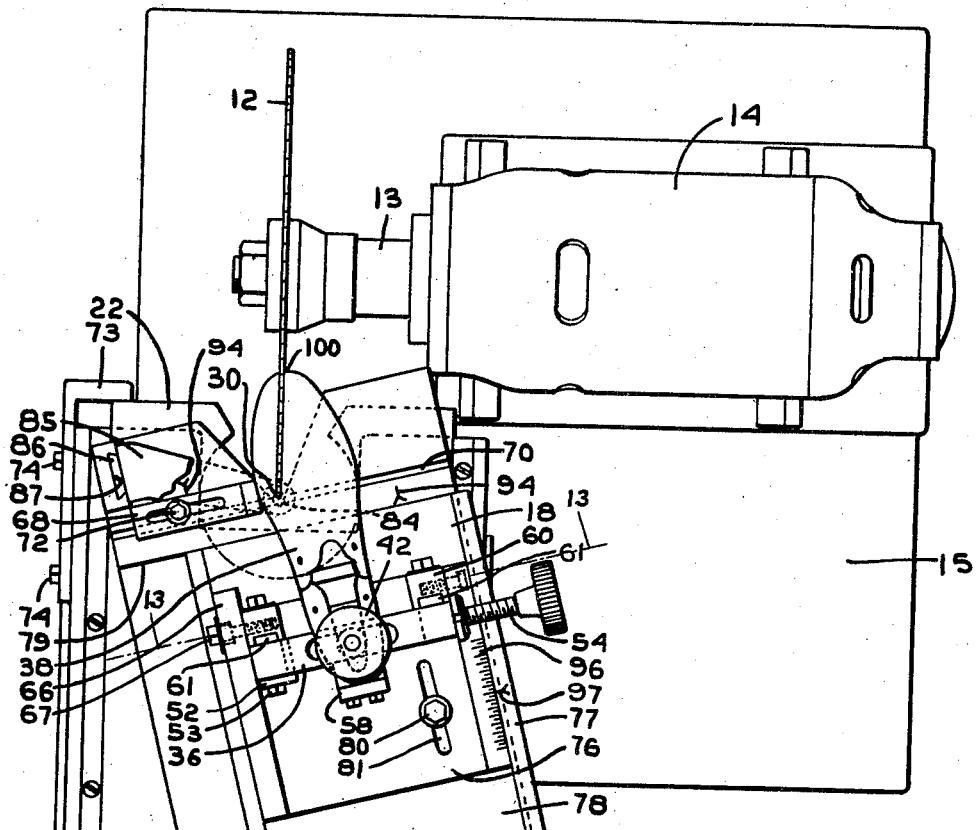
Fig. 1 is a plan view of the device.
Fig. 2 is a perspective view showing the details of construction of the pivot means between two portions of the carriage.

In the embodiment of the invention shown, the sawing operation is performed by a circular saw 12 which is secured directly upon the spindle 13 of a motor 14, which in turn is secured upon a base frame 15. In place of the circular saw 12, a band saw may be substituted or the saw 12 may be belt driven from a suitable source of power in place of being driven directly as shown.

The last holding and feeding instrumentalities are mounted upon a vertically adjustable bracket 16 which slides in vertical ways 17 formed on the base 15. The bracket 16 supports the carriage 18, in which the last is clamped during the cutting operation. The bracket and carriage are raised or lowered by rotation of an adjusting screw 19. The purpose of the adjustability of the carriage in a vertical direction will be set forth hereafter.

The carriage 18 moves within ways 20 in a straight path parallel to the plane of the saw. The ways 20 are provided with gib members 21 which are backed by set screws, which provide for accurately setting the gibs to establish and maintain a perfect running fit between the ways and the base portion 22 of the carriage 18.

The carriage is composed of two main portions, the base portion 22 and the upper structure 23, the latter being pivoted upon the former. The pivot means is of special construction wherein the base member 22 has formed therein a large circular aperture 24, as shown in Fig. 2. The upper portion 23 of the carriage is provided with a platform member 25 which has a smooth flat bottom surface 26, which engages the upper flat surface 27 of the base portion 22. The platform member 25 is provided with a downwardly projecting circular trunnion or boss 28 which rotates within the aperture 24. The platform member 25 is provided with a V-shaped slot 29 at its forward end. This slot is wholly within the limits of the boss 28 and extends to and slightly beyond the axis of the boss. The axis of the boss 28 coincides with the axis 30 of the assembled pivot means.

As will appear hereinafter, the carriage is fed into the cut until the forward edge of the saw teeth reach the axis 30. The slot 29, therefore, provides clearance for the saw when cutting straight into the last or when cutting at various angles.

As shown in Fig. 1, the upper portion 23 of the carriage carrying the last is swung into the required angle to execute the particular cut shown therein. In many wedging operations, a plurality of cuts are made on each last, in which case, the last must be swung into a plurality of positions before it is removed from its clamped-in position in the carriage to be replaced with another last. In such case, provision is made to enable the operator to again swing the carriage into the same angular position, thereby enabling him to process succeeding lasts with uniform results. To accomplish this, a system of adjustable stops is provided to positively locate or establish the required angular position.

The rear end portion of the platform member 25 is shaped to a radius swung from the axis 30 and is provided with adjustable stops 31 which have slots 32 therein, within which are received clamping screws 33, which have screw threaded engagement with the member 25. If desired, a plurality of screw holes 34 may be provided in the member 25 to permit greater scope of adjustment of the stops 31. To adjust the stops, the member 25 is swung into the correct angular position and a stop is moved into engagement with the stop pin 35, where it is secured by tightening the clamping screw 33. The member 25 is then swung into the other desired angular position and the second stop is moved into engagement with the pin 35 and clamped by the clamping screw 33. The two angles are thus immediately available to the operator for processing a succession of lasts.

The last clamping means consists of a yoke or frame 36 into the opening 37 of which the last is placed. If the last 38 is to be clamped in a vertical position, its heel end is inserted in the opening 37 with the bottom of its heel engaging the heel rest 39. A clamping screw 40 is provided for engaging the flat top surface 41 of the comb of the last. The clamping screw 40 is provided with an operating knob 42. The shank of the screw passes through and has threaded engagement in a block 43, which is adjustable laterally in a slot 44 in the top of the frame 36. The block is locked in a given position by a locking nut 45 which is threaded on the upper end of the block and acts to clamp the block by reason of the engagement of the headed end 46 thereof with the bottom face of the top portion of the frame 36, while the nut 45 engages its upper face. This lateral adjustment of the clamping screw is provided to accommodate the clamping means to a wide variety of style and size of last.

The heel rest 39 is detachably secured in its position within the frame 36 by reason of its engagement with a pair of pins 47, which are fixed in a vertical position in the lower portion of the frame 36. The pins 47 extend upwardly into properly positioned apertures in the heel rest.

When a last is clamped in vertical position, as shown in full line, Fig. 4, wedging operations such as those illustrated in Figs. 7 and 8 are executed wherein the plane of the saw cut is vertical. However, certain other operations, such as those illustrated in Figs. 9, 10 and 11 are executed when the last is clamped in a horizontal position as shown in dotted line in Fig. 4. A heel rest 48 is provided, against which the bottom face of the heel portion of the last abuts when the last is clamped in a horizontal position. This heel rest is provided with a concaved face 49 which functions in a manner similar to the face 50 of the rest 39 which embraces the bottom surface of the last and is similarly interchangeable to accommodate lasts of various types. The heel rest 48 is secured upon the inner face of a side portion of the frame 36. Desirably, the heel rest is vertically adjustable thereon. To obtain this adjustment, a vertical slot 51 may be formed in an extension 52, which overlies one of the adjacent side faces of the side member upon which the heel rest is mounted. A clamping screw 53 is received in the slot 51 and has screw threaded engagement in the frame 36. The rest 48 may thus be moved into the required position and clamped therein by the screw 53.

Co-acting with the rest 48, a screw 54 engages the comb of the last. This screw 54 is received in a block 55 of similar construction to the block 43. The block is vertically adjustable in a slot 56 in the side member 57 of the frame 36 in the same manner as the block 43. By properly adjusting the screw 54 vertically and aligning therewith the heel rest 48, a last may be clamped at any required vertical position within the frame 36. When inserting a last in the clamping frame 36, either in a horizontal or vertical position, its rear extremity is abutted against the stop member 58 secured to the frame.

When wedging women's lasts which have a medium or extreme heel height, it is desirable to raise the heel of the last to substantially its normal height when executing the wedge cut on such a last. To provide for clamping and holding such a last, the yoke or frame 36 is adjustable vertically with respect to the top or working surface 59 of the platform member 25. This adjustment may be effected in any suitable manner. As illustrated herein, it is slidably mounted on a U-shaped support 60. The frame member 36 is guided in its vertical movement by ways 61 comprising projections on the frame member and complementary grooves in the support 60. The bottom of the grooves are provided with slots 62 within which are received clamping screws 63 which have screw threaded engagement with the frame 36. To adjust the vertical position of the frame 36, the screws 63 are loosened, the frame moved into the desired position and the screws 63 again tightened.

To provide further flexibility of adjustment, the clamping frame 36 is provided with means for tilting it out of a vertical plane into a position such as that illustrated in dotted lines, Fig. 3. Any convenient means may be employed to accomplish this end; as shown herein, the U-shaped support 60 is pivoted with respect to the platform member 25 upon a pair of trunnion screws 65, having screw threaded engagement in the member 60. The two screws rotate in bearings in the platform member 25 and are situated upon a common axis adjacent the plane of the working surface 59. Any suitable means may be provided for locking the frame in its adjusted position. As illustrated herein, the platform member 25 is provided with an upstanding boss 66 having a slot therein disposed radially about the axis upon which the frame 36 is pivoted. A clamping screw 67 extends through the slot and has screw threaded engagement in the frame. To lock the frame in any desired position, the screw 67 is tightened against the boss 66.

A side gauge 68 is provided which desirably is so situated that its vertical gauging face 69 will engage a last adjacent its ball section. The gauge 68 is laterally adjustable with respect to the direction of motion of the carriage. It is guided by means of a groove 70 formed in the working surface 59 of the carriage, within which a complementary projection 71 on the gauge member is received. The adjustment of the guage is held against disturbance by a clamping screw 72.

The inward limit of the feeding travel of the carriage is determined by an adjustable stop 73. The stop 73 is provided with an arm which projects into the path of the carriage. The stop is clamped in position by means of a pair of screws 74, screw-threaded into the base member 24. The stop 73 is provided with slots 75 within which the clamping screws 74 are received. The slots permit the necessary adjustment of the position of the stop to be made.

It will appear hereinafter in connection with the description of the operation of the device, that it is necessary after clamping it in the frame, to position the last bodily in the carriage with relation to the axis 30, thereby to execute a cut of the required depth and angular disposition. Special construction of the upper structure 23 makes possible the proper positioning of the last for any desired cutting operation. Any suitable means may be employed to accomplish this end. A desirable construction is shown in the drawings, in which the clamping frame 36 is mounted upon a supporting plate 76. The plate 76 is embraced at its side edges by a pair of parallel guide flanges 77, upstanding from another supporting plate 78, upon which the plate 76 rests. The flanges 77 extend in a direction toward the saw 12 and guide the plate 76 in a straight path. The supporting plate 78 is in turn received in a wide channel formed in the platform member 25 extending at right angles to the flanges 77. The parallel side walls 79 of the channel engage the parallel front and back edges of the plate 78 and guide it in a straight line. The plates 76 and 78 may be locked in adjusted position in any suitable manner. As herein shown, the plate 76 is locked to the plate 78 by means of a screw 80 passing through the plate and having screw threaded engagement with the plate 77. A slot 81 is provided to permit the necessary relative adjustment between the plates. The plate 78 is locked against relative movement with the platform member by a screw 82 which passes through a transverse slot 83 in the plate 78.

An important feature of the invention resides in a highly efficient means for enabling an operator to rapidly and accurately adjust the various positioning and gauging means above described, to execute a specified wedging operation. To aid in describing the operation of this last positioning means, it may be well to re-state the fact that the base plate 22 acts to guide the carriage 18 in a straight, fixed path with respect to the saw, and also that the stop 73 determines the extent of inward travel of the carriage. Thus, it will be seen, that the travel of the carriage is precisely consistent and, therefore, accurate and consistent placement of the last or a succession of lasts in the carriage will produce consistently accurate wedging cuts.

To accomplish this accurate placement of the last in the fixture, a fixed reference point is chosen with respect to which the operator determines the correct placement of the last in the fixture. The reference point chosen, lies upon the axis 30 about which the two parts of the carriage pivot. This point is chosen because it remains fixed regardless of the angular position of the upper portion of the carriage with respect to the plane of the saw. To make available to the operator at all times the location of the reference point, an indicating pointer 84 is provided, the axis of which lies at all times upon the axis 30. The pointer 84 may be of any convenient form. As shown herein, it comprises a straight cylindrical rod sharply pointed at its lower end. The pointer 84 is supported above the work surface 59 and arranged to be moved vertically downward or upward to enable the operator to move it into a position closely adjacent the surface of the last. Any suitable means of supporting the pointer may be employed. A desirable construction is that illustrated in the drawings, in which a bracket 85 is provided with an aperture, the axis of which lies upon the axis 30. To enable the bracket 85 to be quickly removed and replaced, it is provided with a socket connection to the base member 25 of the carriage. The bracket has a laterally extending horizontal portion and a vertically downward extending portion, which terminates at the side of the working surface 59. The socket connection, above referred to, may conveniently be of tapered dovetail construction, wherein the lower end of the bracket is provided with a tapered male member 86, which is received in a complementary female member 87, rigid with the platform member 25. The bracket 85 and the pointer 84 may thus readily be removed and replaced in accurate position. The pointer 84 desirably is provided with means for frictionally retaining it in any vertically adjusted position. The friction desirably is provided by means of a small leaf spring 88, which is held against movement vertically in the boss 89 within which the pointer slides. The spring 88 is bowed outwardly to exert pressure against the pointer 84.

To convey a complete and accurate conception of the principles involved in the invention, a description of the opertion thereof will now be presented. Let it be assumed that it is desired to broaden the forepart of a last. To accomplish this end, one or more wedges are inserted in the manner illustrated in Fig. 7, wherein wedges 90 and 91 are inserted in the forepart of the last 92. These wedges are cemented into position and when the cement is hard, they are ready for a re-turning operation in a last lathe, which operation results in a last having the desired increased width in the forepart. This turning operation will not be described in detail, since it forms no part of the present invention.

Whatever the type of wedging operation to be performed, the first step in the procedure is to mark upon a last to be operated upon, the desired location of the termination of the cut to be made. It is only necessary to so mark one of a number of lasts to be processed. The next step in the process is to properly place lasts in the fixture and adjust the various positioning gauges to enable the operator to rapidly place a succession of similar lasts in identical position in the fixture.

Referring to the sample chosen, illustrated in Fig. 7, the plane of the cut to be made is vertical with respect to the normal position of the last. The last, therefore, will be clamped in a vertical position in the fixture. The heel part of the last is placed in the clamping frame 36 with its bottom resting upon the heel plate 39, its rear extremity engaging the back gauge 58 and the flat upper face of its comb portion beneath the clamping screw 40. The screw 40 is then clamped down upon the last, securing it firmly in the frame 36. If the last is of a medium or high heel type, the heel should be raised to substantially its normal height. To establish this normal heel height position, the frame 36 is raised bodily. To do this, the clamping screws 63 and 67 are loosened. The frame 36 is then raised to the required height and at the same time, the frame 36 is swung downward about the trunnion screws 65 until the last forepart rests upon the work surface 59. The screws 63 and 67 are then tightened. The last at this time lies lengthwise of and substantially parallel to the feeding motion of the carriage. In placing the last in the clamping frame 36, the operator must observe whether the contour of the heel rest 39 coincides with the contour of the bottom of the last. It will be found, however, that one heel rest will be satisfactory for a substantially great number of styles of lasts, which can be clamped into position without changing the heel rest.

Due to the wide variety of shapes in lasts, it may be found necessary to shift the lateral position of the screw 40 in order to squarely clamp the last in a true vertical position. The lateral adjustment of the screw 40 is accomplished in the manner hereinbefore described. The clamping screw 72 is now loosened and the gauging face 69 of the side gauge 68 is moved into contact with the last and clamped in position. The side gauge desirably is provided with scale markings 93, while the work surface 59 has engraved thereon a co-operating index line 94. Desirably, there are two index lines 94, one on each side of the work surface. The side gauge may, therefore, be used in a position either on the right or left side of the last, whichever may be the most convenient. After the adjustment is made, the position of the scale with respect to the index lines 94 is noted for future reference.

Having located upon the last, the point of termination of the cut to be made; for example, the point 95 on the last 92, the clamping frame 36 carrying the last is now moved into position where the pointer 84 is directly above the mark 95. To do this, the clamping screws 80 and 82 are loosened and the plates 76 and 78 shifted until the point 95 is directly beneath the pointer 84. The clamping screws 79 and 81 are then tightened. The last is thus accurately placed in its proper position in the carriage and furthermore an unlimited number of lasts of the same type and style can be rapidly placed in identical positions in the carriage.

It may be desirable to record the position of the last with respect to the carriage elements. This may be done in any suitable manner. As shown herein, a scale 96 is engraved upon the plate 76, while a cooperating index mark 97 is placed upon a flange 77 of the plate 76. The relative position between the plates 76 and 78 may thus be recorded for future reference. A similar scale 98 is engraved upon the plate 78, having a co-operative index mark 99 placed upon the portion 23 of the carriage. The relation between the plate 78 and the portion 23 of the carriage may thus be noted and recorded. If the occasion arises sometime in the future to process the same style and size of last in the same manner, reference may be had to the prior setting of the fixture and the adjustment immediately made with a minimum of effort and in a very short period of time.

The next step in the operation of adjusting the fixture to establish the correct angular disposition of the last with respect to the saw. This is very readily done in the following manner: The carriage 18 is moved toward the saw until the last is closely adjacent the periphery of the saw. The upper structure 23 is then swung about the axis 30 until the periphery of the saw is adjacent the point upon the last at which it is desired to initiate the cut. In the example chosen, this point is indicated at 100 in Fig. 7. One of the adjustable stop members 31 is then moved into contact with the pin 35 and clamped in this position. The upper structure of the carriage then assumes the position shown in Figs. 1 and 3. The stop 31 and the pin 35 thus serve to establish the correct angle for the cut. The operator maintains the stop against the pin while executing the cut. For purposes of record, a scale 101 is engraved along the top face of the circular abutment 102 against which the stop members lie, while an index line 103 is placed upon the stop member. The position of the stop member may, therefore, be noted and recorded for future reference.

The carriage is then fed toward the rotating saw until it engages the stop 73. Thus the cutting operation is executed in the exact predetermined position required and as many lasts as desired processed in the same way. Having completed the cutting operation on the first last, the carriage is backed off, the screw 49 is released and another last placed in position. To insure accurate placement of the last, it is necessary only that the operator place the last in engagement with the various positioning gauges above described. Obviously, the changing operation requires very little time and effort and a large number of lasts may be processed at high production speed.

In the general description of the invention, a means is described for bodily raising and lowering the carriage 18 with respect to the saw. This feature is important when using a circular saw to execute the wedging cut. The necessity for this vertical adjustment of the carriage is best considered in connection with a lateral or relieving cut which must be made in the last to permit the marginal portion 104 in last 92 to be swung outwardly as the wedge 91 is inserted in the saw kerf. The marginal portion 104 must swing outwardly in a plane substantially parallel to the last bottom, so that the generally flat bottom of the last is not distorted. To facilitate the swinging or hinging action which takes place when the marginal portion 104 is swung outwardly, it is standard practice, as above suggested, to saw a lateral extending relieving cut 105. This cut desirably is disposed at substantially right angles to the main wedge cut, and is made by the relatively thin blade of a band saw. The relieving cut 105 is so situated that it terminates close to the inner end of the main wedge cut, designated at 95 in Fig. 7. A small vertical web of wood then remains as the sole connection between the body of the last and the portion 104. This small web acts as a hinging point and offers only slight resistance to the expansion of the last to receive the wedge 91.

It is important that this web be perpendicular to the plane in which it is desired to swing the portion 104. In the example chosen, therefore, since the portion 104 must move in a substantially horizontal plane, the web which serves as a hinge must be disposed vertically. To produce this condition, the termination of the forward wall of the saw kerf must be disposed substantially vertically. As above explained, the relieving cut 105 is made on a band saw, which automatically produces a vertical cut when the last is held vertically. However, the disposition of the cut made by the saw 12 depends upon the relative height of the last with respect to the saw when the cut is made. By properly adjusting the carriage height with respect to the saw, a cut can be made in the last wherein the point on the last surface at which the periphery of the saw enters the cut, is vertically disposed above the point where it emerges from the cut, when the saw has reached the point 95. Thus conditions are created at the point 95, which insure that the marginal portion 104 will swing outwardly in a horizontal plane and thus maintain the contour of the bottom of the last in undistorted condition. By varying such procedure, for instance, by moving the carriage upward or downward, it is possible to produce a great number of different results, which may be required to fulfill a predetermined condition. Examples of these variations will appear in connection with the execution of other types of wedging operations, as described hereinafter.

It is usual, in wedging operations of the type above described, to insert two wedges, as illustrated in Fig. 7. The last is prepared to receive an additional wedge 90 by following the same procedure as above described in making the required adjustments in the fixture. However, after setting the fixture for the angular placement of this additional wedge cut, the angular adjustment is maintained during the processing of a plurality of lasts by providing an additional stop member 31 shown on the right hand side of the platform member in Fig. 1. This stop is moved into engagement with the pin 35 and secured in this position. The adjustment of the stop member 31 on the left hand side of the platform member is thus undisturbed. The right hand stop member is provided with an index mark 106. After the adjustment is made, the relative position of the mark 106 with respect to the scale 103 is noted. The second wedge cut is then executed upon the run of lasts upon which the first wedging cut has just been completed. After cementing the wedges in place, the lasts are ready for the re-turning operation.

Another common type of wedging operation which may be readily executed by the practice of the present invention, is that illustrated in Fig. 8. In this operation, it is desired to modify only a relatively small area of the toe end of the last, without increasing the width of the last forepart. This operation is carried out by cutting a V-shaped slot 107 from the toe end of the last rearwardly a short distance into the body of the forepart and then cementing a complementary V-shaped wedge 108 into position in the slot 107.

The procedure for adjusting the fixture to execute this wedging operation is similar to the produce described in connection with the last shown in Fig. 7. The desired location of the apex the V-slot having first been marked upon the last, it is clamped in the frame 36 in its normal vertical position and the correct adjustment of all the positioning gauges is established in the manner hereinbefore set forth. Having completed these adjustments, the point 109 will lie directly beneath the pointer 84. The two stops 31 are then adjusted properly to establish the correct included angle of the predetermined V-slot. Both cuts necessary to form the V-slot can then rapidly be executed without removing the last from the fixture. The second cut meets the first cut at the apex 109, thus completing the slot. A wedge is then made to fit the slot and cemented into position. The wedge may be produced in any desired manner, since its production forms no part of the present invention.

Another wedging operation is illustrated in Fig. 9. This operation is executed with the last held in a horizontal position or lying on its side, as shown in dotted line in Fig. 4. In this example, the contour of the top portion of the last remains unchanged; but the bottom or sole of the forepart is lowered, thereby to thicken or increase the height of the toe portion of the last. To place this last in the fixture and make the necessary adjustments therein, substantially the same procedure is followed as that described above in connection with Fig. 7. The chief difference in this procedure is that the last must be placed in the clamping frame 36 with its normal vertical plane in a horizontal position. In this position, the bottom of the last bears against the heel plate 48, its back extremity is placed against the back gauge 58 and the last is clamped in position by the screw 54. The side gauge 68 is adjusted into engagement with the last and the frame 36 is tilted downward until the last forepart rests upon the work surface 59. All of the adjustment locking devices are then tightened and the operator is then ready to proceed with the wedging operation on any number of similar lasts.

The plane of the saw kerf in this example is disposed in parallel relation to the last bottom. Similarly to the foregoing example, the portion 10 of the present example must swing downward in a plane at right angles to the plane of the saw kerf to avoid distortion of the last contour. This limitation requires that the hinging web 112 be disposed at right angles to a longitudinal median axis of the last. To fulfill this condition, the vertical position of the carriage with respect to the saw must be correctly adjusted to compensate for the angular position of the last in the carriage occasioned by tilting of the clamping frame 36. A relative position of the last and saw is readily obtained, which will produce the required condition at the hinging web 112, at the time the carriage has reached the end of its working stroke.

Upon completion of the adjustments of the fixture, successive lasts may be uniformly processed in rapid succession with the aid of the various positioning elements to produce the wedging cut 111. The hinging web portion 112 is then created by executing the relieving cut 113, which extends from the last bottom adjacent the end of the cut 111 inward into the body of the last to a point closely adjacent the cut 111. This cut may be made in any suitable manner, as by a band saw. A wedge 114 of the required size is then cemented into position, after which the last is ready for the re-turning operation, which is executed in the usual manner.

Another wedging operation is illustrated in Fig. 10. The adjustments for producing this type of wedging are carried out in the same manner as the adjustment described in connection with Fig. 9, with the exception that the relieving cut 115 extends from the top of the last downward toward the end 116 of the wedge cut. In this operation, therefore, the wedge 117 raises the top portion of the forepart and thereby adds depth to the forepart without modifying the contour of the bottom of the last.

Another common type of wedging operation is illustrated in Fig. 11. The adjustment set up for this operation is very similar to that required for the wedging operation shown in Fig. 8. The only variation from that set-up lies in the disposition of the plane of the cut, which is made at right angles to that shown in Fig. 8. Obviously, to execute this operation, the last is clamped on its side in a horizontal position, the same as described in connection with Figs. 9 and 10. Otherwise, the setup and operations necessary to produce the cut, are the same as those employed in the examples shown in Fig. 8. The wedging operation is shown in Fig. 8. The wedging operation shown in Fig. 11, however, differs from that shown in Fig. 8, in that somewhat more scope for varying the contour of the last is obtained by supplying a wedge 118 of generous width, thus broadening the extreme forward contour of the forepart.

Referring to the execution of the relieving cut, such as the cut 105, 113 and 115, given as examples in the foregoing description, it is essential that they be executed accurately and uniformly. A desirable means for executing these cuts is illustrated in Fig. 12. The most satisfactory saw for this purpose is the band saw. In the illustrated embodiment shown, the saw 119 moves through a work table 120. A specially constructed feeding device for the carriage 121 is provided for feeding the last to the saw. This carriage has a base member 122 and an adjustable last holding member 123. This holding member is provided with a plate 124, which is rigidly supported in a vertical position. The forward edge 125 of the plate is disposed at right angles to the table 120 and parallel to the saw 119.

The holding member 123 is arranged for angular adjustment with respect to the base 122. The axis of the swinging movement of the holder 123 is situated at the edge 125 of the plate 124. This angular adjustment is obtained in any suitable way, as by forming a circular ridge 126 upon the base, which is received within the complementary groove 127 in the last holding element 123. A clamping screw 128X is provided, which is received within a circular groove 128 and acts to lock the holder 123 in adjusted position.

Any suitable means may be provided for guiding the carriage 121 in proper relation to the saw. A suitable means is illustrated herein, which comprises a guide plate or fence 129 against the edge 130 of which the edge 131 of the carriage is held by the operator, as the carriage is fed into the cut. The fence 129 is fixed upon a table 120 in any suitable manner, such as by means of clamps, not shown. A stop 132 is provided for limiting the travel of the carriage. The stop is adjustable along the guide or fence 129 and is locked in adjusted position by the screw 133.

The operation of the device is as follows: The last 134, after completion of the major wedging cut, such as the cut 111, Fig. 9, is placed in position upon the carriage 121. To do this, the plate 124 is received in the cut 111 and the last held in position, with the front edge 125 of the plate firmly engaging the end wall of the cut. The carriage at this time is, of course, retracted. The holder portion 123 of the carriage is adjusted into correct angular position. In the example illustrated, the angle of the plate 124 with respect to the plane of the saw is substantially 90°.

To execute the cut, the operator moves the carriage along the guiding face 130 of the fence 129 in the direction of the arrow until it reaches the stop 132, thus accurately executing the desired relieving cut. The stop has previously been adjusted to limit the penetration of the saw to a short distance from the end wall of the cut 111, as illustrated in Fig. 12. It is readily observed that due to the function of the plate 124, the small web of material between the two cuts will be of uniform thickness and parallel to the end wall of the main cut 111. Furthermore, any number of similar lasts may be rapidly processed by the use of this device. The adjustment of the holder member and stop are readily made to execute any cut which may be found necessary to permit a selected portion of a last to be expanded to receive a wedge.

The fence member 129 is so constructed that the carriage 121 may be fed along either the edge 130 or by reversing its position from that shown in the drawings, may be fed along the edge 135, and its travel is limited by the stop 132. Thus, greater flexibility and adaptability of the device to many different operations is obtained.

It will be obvious to those skilled in the art that among the many great advantages derived from the practice of this invention, one of the greatest of these is the wide flexibility of the apparatus, which permits the execution of a wide variety of wedging operations, any one of which by the use of the apparatus, may be converted into a high speed production operation. Other important features are the uniformity of results, which are assured by the precision of operation of the fixture and, furthermore, such precision can be readily maintained by an unskilled operator.

I claim:

1. An apparatus for wedge-cutting lasts preparatory to remodeling which comprises a driven saw, a carriage, means for guiding the carriage in a linear path parallel to the plane of the saw, a stop for limiting the work stroke of the carriage, a clamping yoke on said carriage having means for securing a last in a fixed predetermined position in said yoke, a plurality of slides for bodily shifting said yoke upon the carriage to position the last in predetermined relation to the saw, means for clamping said yoke on the carriage in adjusted position, a removable pointer situated in the plane of said saw and in line with the front wall of the saw kerf in all positions of the yoke on the carriage when the carriage engages its stop, the pointer serving to locate the correct position of the last on the carriage to execute a required cut.

2. An apparatus for wedge-cutting lasts preparatory to remodeling which comprises a saw, a carriage for feeding the lasts to the saw, a stop for limiting the work stroke of the carriage, means for guiding the bottom section of the carriage in a straight line parallel to the plane of the saw, the carriage having an upper section pivoted thereon to swing in a plane at right angles to the plane of the saw, the axis of said pivot point lying in the plane of the saw and in line with the forward wall of the saw kerf when the carriage engages its stop, a supporting arm removably secured to said upper carriage section, a vertically disposed and vertically adjustable indicating pointer on said arm situated upon the said axis, a clamping yoke on the upper section of the carriage for securing the lasts in rigid position therein, and means for bodily shifting said clamping yoke upon said carriage, whereby the position and extent of the saw cut in the last may be predetermined by the pointer.

3. An apparatus for wedge-cutting lasts preparatory to remodeling which comprises a driven saw, a carriage for feeding the work to the saw, a stop for limiting the work stroke of the carriage, means for guiding the base section of the carriage in a linear path parallel to the plane of the saw, the carriage having an upper section pivoted upon said base section on an axis situated in the plane of the saw and in line with the forward edge of the saw when the carriage engages its stop, a removable bracket on said upper section of the carriage, a pointer vertically movable in said bracket and situated upon said axis, a work surface upon said upper section of the carriage upon which a fore part of a last rests during the cutting operation, a clamping yoke mounted on the upper section of the carriage and having means for rigidly securing a last therein at its rear part, a double slide on the upper carriage section operable to permit bodily shifting of said yoke to align the last in a desired manner with respect to the saw, and means for locking said slides in adjusted position.

4. An apparatus for wedge-cutting lasts preparatory to remodeling which comprises a saw, a carriage, a stop for limiting the work stroke of the carriage, said carriage having a base section guided in a linear path parallel to the plane of the saw, and an upper section pivoted upon said base section to swing in a plane at right angles to the plane of the saw on an axis in the plane of the saw and in line with the forward edge of the saw when the carriage engages its stop, a double slide having one section slidable transversely of the upper section of the carriage, the other section of the slide being movable at right angles to the first mentioned section, a clamping yoke within which the last to be processed is rigidly secured, said yoke being mounted upon the upper section of said double slide, and means for angularly adjusting said clamping yoke in a vertical plane.

GEORGE CLAUSING.